(12) United States Patent
Chang et al.

(10) Patent No.: US 8,904,396 B2
(45) Date of Patent: Dec. 2, 2014

(54) SYSTEM AND METHOD OF GENERAL SERVICE MANAGEMENT

(75) Inventors: Baojian Chang, Beijing (CN); Zhuhua Yin, Beijing (CN); Dongmei Zhou, Ping Xiang (CN); Guoxian Shang, Beijing (CN)

(73) Assignee: CA, Inc., New York, NY (US)

( * ) Notice: Subject to any disclaimer, the term of this patent is extended or adjusted under 35 U.S.C. 154(b) by 455 days.

(21) Appl. No.: 12/844,195

(22) Filed: Jul. 27, 2010

(65) Prior Publication Data
US 2012/0030680 A1 Feb. 2, 2012

(51) Int. Cl.
*G06F 9/46* (2006.01)
*H04L 12/24* (2006.01)
*G06F 9/50* (2006.01)
*H04L 29/08* (2006.01)

(52) U.S. Cl.
CPC .......... *G06F 9/5055* (2013.01); *H04L 41/5051* (2013.01); *H04L 41/5058* (2013.01); *H04L 67/16* (2013.01)

USPC ......................................................... 718/102

(58) Field of Classification Search
None
See application file for complete search history.

(56) References Cited

U.S. PATENT DOCUMENTS

| | | | | |
|---|---|---|---|---|
| 5,699,518 A * | 12/1997 | Held et al. | ..................... | 709/229 |
| 6,223,217 B1 * | 4/2001 | Pettus | ........................... | 709/219 |
| 2003/0084120 A1 * | 5/2003 | Egli | ................................ | 709/218 |
| 2003/0208583 A1 * | 11/2003 | Schroeder | ...................... | 709/223 |
| 2005/0193097 A1 * | 9/2005 | Guthrie et al. | ................ | 709/219 |

* cited by examiner

*Primary Examiner* — Emerson Puente
*Assistant Examiner* — Sisley Kim
(74) *Attorney, Agent, or Firm* — Myers Bigel Sibley & Sajovec, P.A.

(57) ABSTRACT

A system and method is provided for servicing service management requests via a general service management framework that supports a plurality of platforms (for example, Windows®, UNIX®, Linux, Solaris™, and/or other platforms), and that manages local and/or remote machine services at system and/or application level.

20 Claims, 9 Drawing Sheets

SYSTEM AND METHOD OF GENERAL SERVICE MANAGEMENT

TECHNICAL FIELD

The invention relates to the field of service management. More particularly, the invention relates to providing a general service management framework for managing services.

BACKGROUND

Service management framework may refer to a collection of different system (operating system) and/or application level components that work together to provide flexible, scalable, and distributed service management methods to customers. The customers may utilize interfaces which the framework exposes to develop, deploy, and manage services.

Some current commercial products provide service management frameworks that are platform dependent. Users/developers have to learn complicated interfaces and protocols to manage services associated with these service management frameworks.

These and other drawbacks exist.

SUMMARY

In some implementations, the invention relates to a system and method for providing a general service management framework. The general service management framework may refer to a service management framework that supports a plurality of platforms (for example, Windows®, UNIX®, Linux, Solaris™, and/or other platforms), and/or manages local and remote machine services at system and/or application level. In other words, the general service management framework may provide platform-independent access to a service and/or access to the service irrespective of whether or not the service is a distributed service.

Generally, operating system and/or specific application level components associated with a running system (i.e., a system which is alive and can provide service to a user) may be defined as a service. For example, on UNIX, an ftp process may be defined as a service; in an Oracle server, an Oracle instance may be defined as a service; and in a distributed system, a component executing at a remote site may be defined as a service. One of ordinary skill in the art would recognize that other system/application level components may be defined as services without departing from the spirit of the invention.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
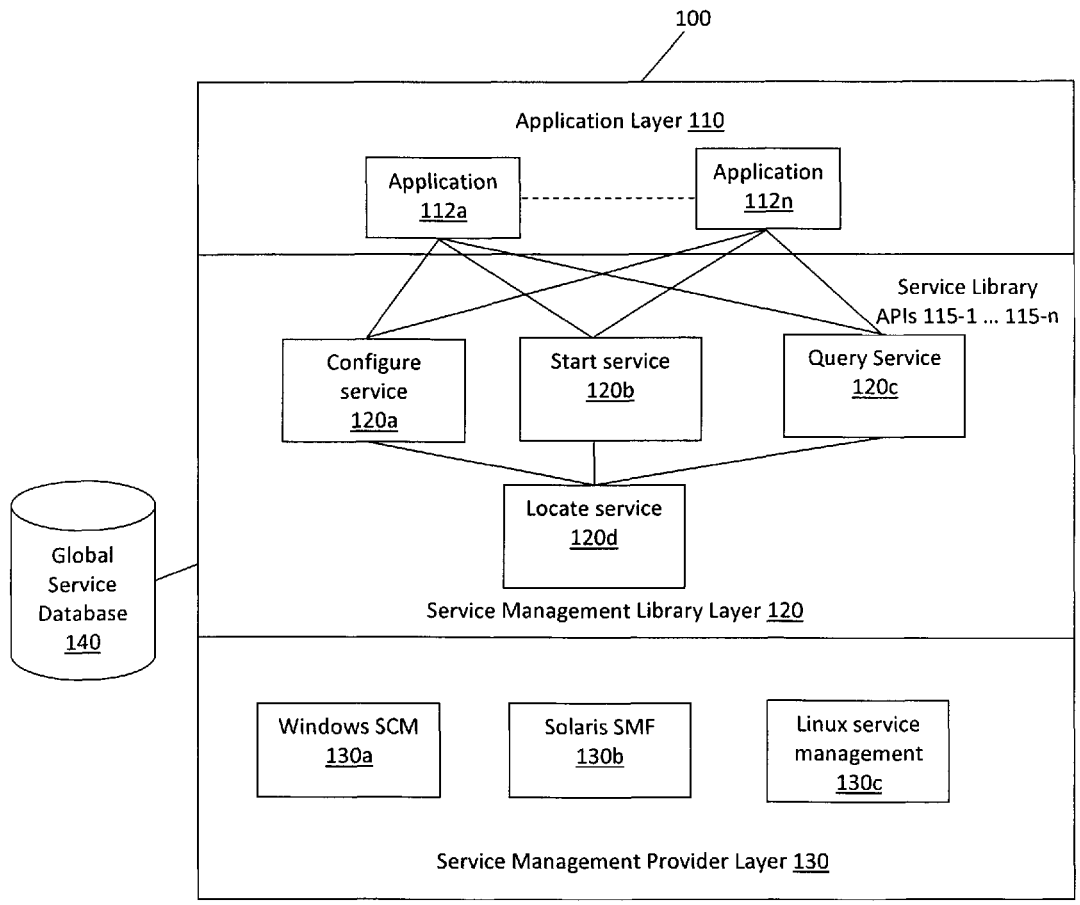
FIG. 1 illustrates an exemplary general service management framework, according to various aspects of the invention.

FIG. 1 is an exemplary illustration of a general service management framework 100, according to an aspect of the invention. The general service management framework 100 may include at least three layers: application layer 110, service management library layer 120, and service management provider layer 130. General service management framework 100 may include a global service database 140 that stores service configuration information. Application layer 110 may include one or more applications and/or components of applications (illustrated in FIG. 1 as application 112a, ..., 112n; hereinafter "applications 112" for convenience). Applications and/or components of applications 112 may initiate/generate/issue service management requests and may send the service management requests to service management library layer 120 through the corresponding service library APIs (application programming interfaces) 115-1, ..., 115-n.

Service management library layer 120 may receive the service management requests through the service library APIs 115-1, ..., 115-n. Service management library layer 120 may include one or more components that enable the various features and functions of various embodiments of the invention. Non-limiting examples of the components may include one or more of a configure service module 120a, a start service module 120b, a query service module 120c, a locate service module 120d, and/or other modules for performing the features and functions described herein. Configure service module 120a may configure one or more services. Start service module 120b may start, stop, or restart services. Query service module 120c may get/set service properties/status from global service database 140. Locate service module 120d may locate one or more services. In one implementation, in a distributed system with at least two nodes, service management library layer 120 may communicate with a peer service management library layer of another node (not shown).

Service management provider layer 130 may be a wrapper of concrete service management infrastructure. The service management infrastructure for a Windows system may be Windows Service Control Manager (SCM) 130a. The service management infrastructure for a Solaris system may be Service Management Facility (SMF) 130b. In case a system is provided with its own local service management infrastructure, service management requests associated with a local service may be delegated to the platform dependent service management infrastructure. As such, for Windows and Solaris systems, the service management providers may be wrappers of SCM 130a (local service management infrastructure for Windows) and SMF 130b (local service management infrastructure for Solaris), respectively. Internally, the service management providers may know how to communicate with SCM and SMF. Linux systems, however, do not have a similar service management infrastructure. The framework may implement the service management infrastructure for Linux systems (i.e., Linux service management 130c). On Linux systems, start/stop and/or other service methods may be implemented by shell scripts or by other programs. The start/stop and/or other service methods may be registered into the framework. Later, if needed, the framework may call the methods automatically. Thus, the framework may manage service requests for platforms (such as Linux systems) that do not include service management infrastructure by storing service methods associated with the service requests.

According to some implementations, applications 112 may include a web application executing on a webserver (not illustrated in FIG. 1) for which a particular service is requested. The web application may communicate the request to service management library layer 120, which may locate or otherwise query global service database 140 to retrieve service configuration information for the requested service. By doing so, the requested service may be located and/or accessed according to the platform on which the requested service is executed and/or based on whether the requested service is executed locally or globally.

According to various implementations, service management library layer 120 may use the service configuration information to access the requested service.

In one implementation, the service configuration information may include an indication that the requested service executes on a Windows platform (among other information such as a name of the requested service, methods of the requested service, etc.). According to this implementation, service management library layer 120 may use Windows SCM 130a to process the request according to methods or other information included in the service configuration information for the requested service.

According to various implementations, the requested service may be determined to execute remotely. According to this implementation, service management library layer 120 may cause the requested service to execute on a remote device. As would be appreciated by one having skill in the art, the foregoing examples are illustrative only and not intended to be limiting. For example, applications 112 may include other applications executing at an application layer as would be appreciated and the requested service may execute on Solaris, Linux, or other platform and/or may be executed remotely or locally.

Figure 3:
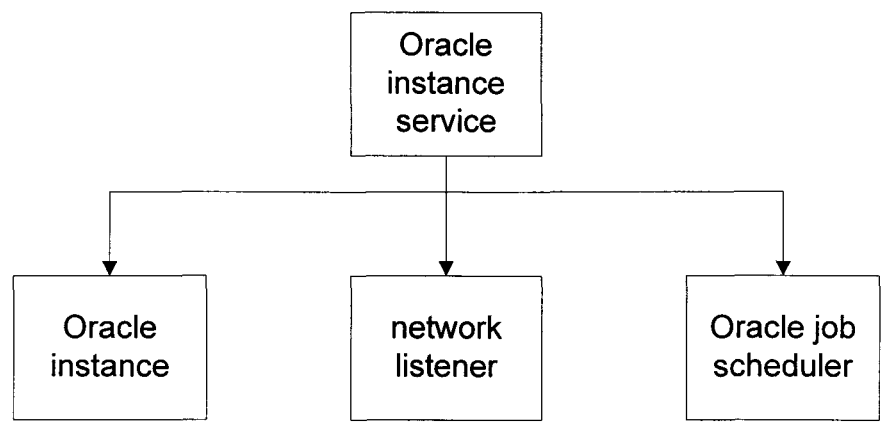
FIG. 3 depicts an exemplary dependency tree, according to various aspects of the invention.

In one implementation, a user may register a service with the framework. A user may define a service and add it to the framework. A user may define a service by providing service configuration information associated with the service. Service configuration information may include, among other things, service name, service location, service methods, service dependency, service startup type, and/or other information. A user may provide any desired name as a service name. Service location may refer to the location of the service, i.e., on local node or remote node, for example. Service location may also refer to the platform on which the service is located/executed (i.e., Windows, Solaris, and/or other types of platforms). Service methods may include start service, stop service, restart service, query service property, enumerate services, and/or other service methods. Service dependency may refer to dependencies between services. One service may require that another service be started if it depends on that service. Dependency may be defined when it is necessary to start several services together in sequence. For example, a dependency may be defined between Oracle network listener, Oracle instance and other Oracle services such as Oracle job scheduler service. If a user wants to start the job scheduler service, then the listener, instance and job scheduler services may be started in sequence. Based on the service dependency information provided by the user, the framework may build a service dependency tree 300 (as depicted in FIG. 3, for example). If a dependent service has further dependencies, then the dependencies may be added recursively. Service startup type may refer to the type of service startup, for example, auto-start, manual-start, disable, etc.

According to various implementations, by receiving a registration (or addition) of services, general service management framework 100 provides an ability to easily add a service to be managed. Thus, general service management framework 100 is scalable to include various services executing on various platforms either remotely or locally. For example, an administrator or other entity may add a service by providing service definitions described above. In doing so, an application executing at an application layer (such as applications 112 illustrated in FIG. 1) may request the added service using general service management framework 100. In this manner, various services may be flexibly added under management irrespective of the platform or whether the service is executed remotely or locally.

Figure 2:
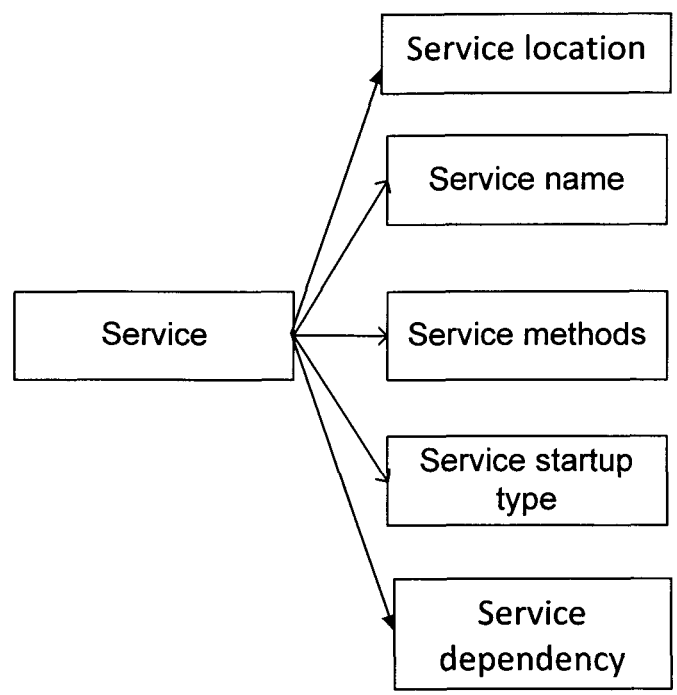
FIG. 2 illustrates an exemplary service definition, according to various aspects of the invention.

FIG. 2 depicts an exemplary service definition 200 which includes service configuration information. The service configuration information may be formatted as an XML or other file, and may be parsed by the framework. The framework may store the service configuration information into global service database 140. Service configuration information may then be retrieved from global service database 140 in response to queries from query service module 120c, for example. Windows and Solaris systems, for example, may have other mechanisms to store service configuration information. However, those mechanisms are local and platform dependent. In one implementation, global service database 140 may be a global database that may store service configuration information associated with all services defined in a distributed system (including nodes running Windows®, UNIX®, Linux, Solaris™, and/or other operating systems) persistently. Even across system reboot, the information may be persistent.

Figure 4:
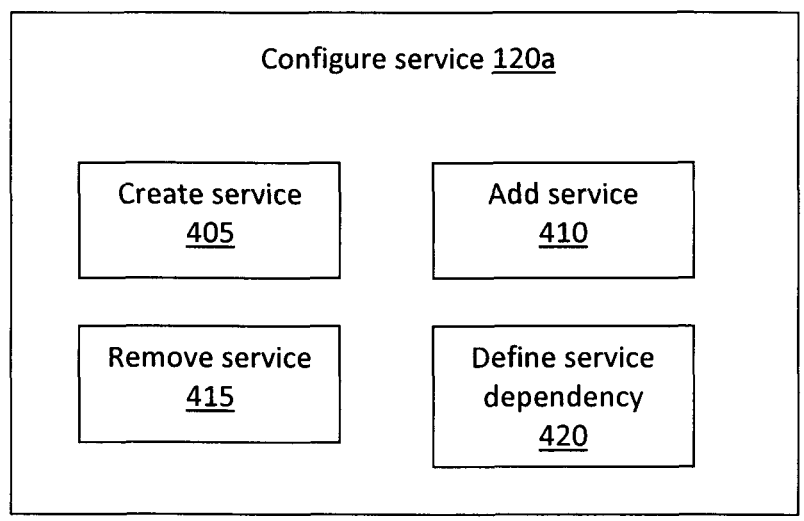
FIG. 4 depicts an exemplary configure service module, according to various aspects of the invention.

Configure service module 120a may include one or more sub-modules for configuring one or more services, as depicted in FIG. 4, for example. Non-limiting examples of sub-modules may include one or more of create service sub-module 405, an add service sub-module 410, a remove service sub-module 415, a define service dependency sub-module 420, and/or other sub-modules. Create service sub-module 405 may create a user defined service based on the service configuration information provided by the user. Add service sub-module 410 may add a service record including service configuration information into global service database 140. Remove service sub-module 415 may remove a service record from global service database 140. Define service dependency sub-module 420 may analyze the service dependencies between existing services and user defined/added services. Define service dependency sub-module 420 may build a service dependency tree 300 in memory and serialize to global service database 140.

Figure 5:
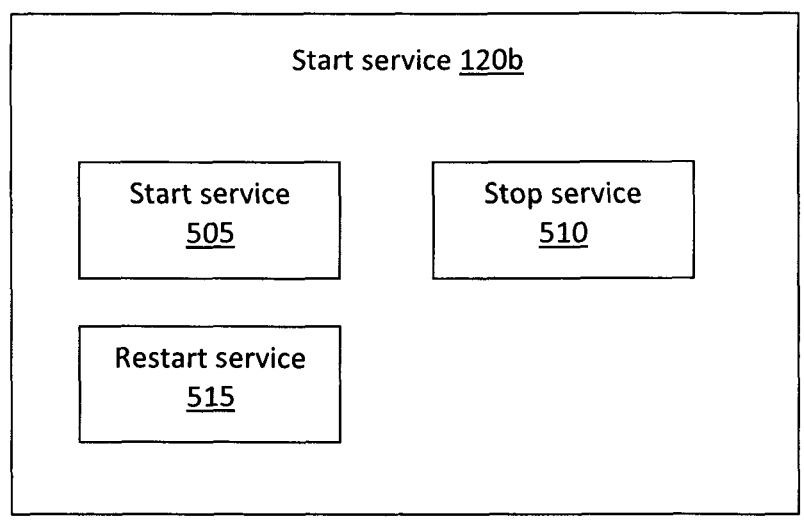
FIG. 5 depicts an exemplary start service module, according to various aspects of the invention.

Start service module 120b may include one or more sub-modules for starting/stopping/restarting one or more services, as depicted in FIG. 5, for example. Non-limiting examples of sub-modules may include one or more of start service sub-module 505, a stop service sub-module 510, a restart service sub-module 515, and/or other sub-modules. Start service sub-module 505 may start a service. Stop service sub-module 510 may stop a service. Restart service sub-module 515 may restart a service.

Figure 6:
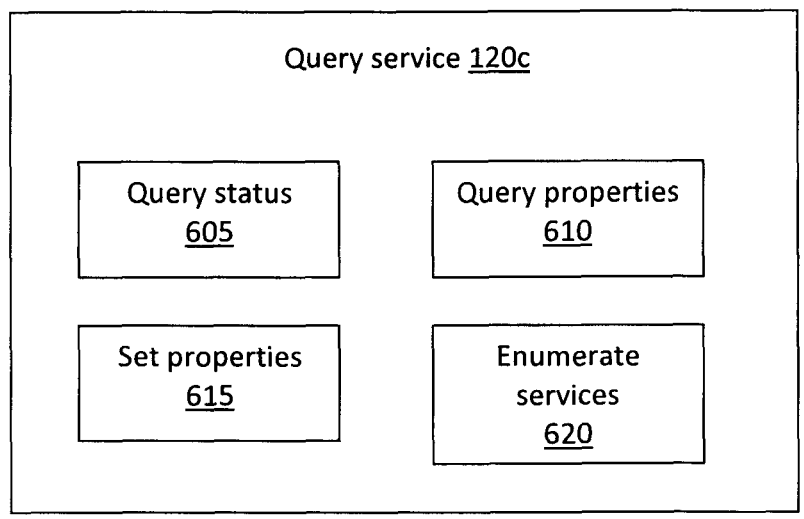
FIG. 6 depicts an exemplary query service module, according to various aspects of the invention.

Query service module 120c may include one or more sub-modules for getting/setting one or more services' properties/status from global service database 140, as depicted in FIG. 6, for example. Non-limiting examples of sub-modules may include one or more of query status sub-module 605, a query properties sub-module 610, a set properties sub-module 615, enumerate services sub-module 620, and/or other sub-modules. Query status sub-module 605 may get the status of a specific service. The status may include open, close, auto-start, manual-start, and/or other status. Query properties sub-module 610 may query the global service database 140 for details regarding a service, for example, service configuration information (i.e., name, location, dependency, etc.). Set properties sub-module 615 may set properties for a service. Enumerate services sub-module 620 may enumerate a node's services and/or a specific service's dependent services.

Figure 7:
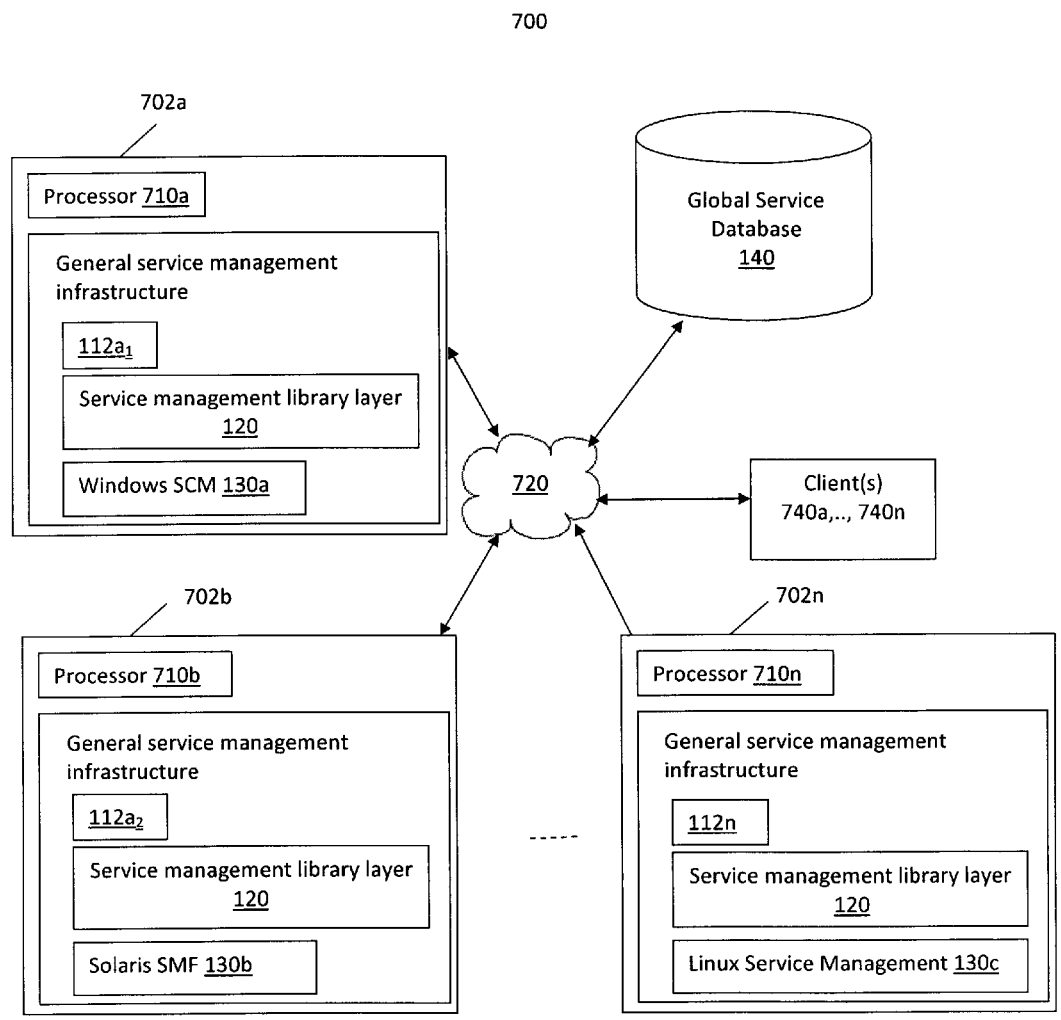
FIG. 7 depicts an exemplary distributed system implementing the general service management framework, according to various aspects of the invention.

FIG. 7 illustrates an exemplary distributed system 700 implementing the general service management framework, according to various aspects of the invention. The distributed system may comprise at least two network nodes 702a, 702b, . . . , 702n that communicate through a communication network 720 (e.g., LAN, WAN, Internet, and/or other communication network). Each network node may be communicatively coupled to global service database 140. A network node may comprise a server, a computer terminal, a workstation, a host computer, and/or other network devices/machines. Network node 702a may run a Windows operating system, network node 702b may run a Solaris operating system, and network node 702n may run a Linux operating system. It will be understood that other network nodes may run these or other operating systems. The general service management framework may manage system and/or application level services associated with these nodes regardless of the operating system they run.

Each network node, for example, 702a, 702b, . . . , 702n may include a processor (710a, 710b, . . . , 710n, respectively), circuitry and/or hardware operable to execute computer-readable instructions. According to one aspect of the invention, distributed system/network nodes may include one or more tangible computer-readable storage media configured to store one or more software modules, wherein the software modules include computer-readable instructions that when executed by the processor cause the processor to perform the functions described herein. According to one implementation, the network nodes may comprise computer hardware programmed with a computer application having one or more software modules that enable various features and functions of the invention.

In one implementation, network nodes 702a, 702b may be any physical or virtual servers that are configured to host/execute/run one or more components of a distributed application (for example, application 112a may be a distributed application). Network node 702a may be a web server associated with the distributed application and network node 702b may be a database server associated with the distributed application. The general service management framework implemented by network node 702a may comprise a component of distributed application 112a (112a_1) in application layer 110 (referred hereinafter as application component 112a_1) that may communicate with service management library layer 120, and Windows SCM 130a in the service management provider layer 130. The general service management framework implemented by network node 702b may comprise a component of distributed application 112a (112a_2) in application layer 110 (referred hereinafter as application component 112a_2) that may communicate with service management library layer 120, and Solaris SMF 130b in the service management provider layer 130.

System administrators (or other users) may interact with the distributed system/network nodes in the distributed system via one or more client devices 740a, . . . , 740n. Client devices may each comprise a user interface/graphical user interface (GUI) that may enable users to perform various operations that may facilitate interaction with the distributed system/network nodes in the distributed system, including, for example, defining and registering services associated with each network node, defining service configuration information, initiating service management requests, and/or performing other operations. Client devices 740a, . . . , 740n may include a processor (not shown), circuitry, and/or other hardware operable to execute computer-readable instructions.

In one implementation, users may define and register services associated with each network node 702a, 702b, . . . , 702n via a GUI of client device 740a, for example. A user may define a service by providing service configuration information associated with the service. Service configuration information may include, among other things, service name, service location, service methods, service dependency, service type, and/or other information. Each network node may receive the service configuration information associated with a service defined for the network node. For example, if a user has defined a service for network node 702a, the service configuration information associated with the defined service is provided to configure service module 120a of service management library layer 120 associated with network node 702a. The service configuration information associated with a service defined for network node 702a may include any desired name as the service name; network node 702a (i.e., local node) and/or with Windows platform as the service location; start service, stop service, restart service, and/or other service methods as the service methods; any dependencies for the defined service as the service dependency, and auto-start as the service startup type. Configure service module 120a may create a user defined service associated with network node 702a based on the service configuration information and may add/insert a service record including the service configuration information into global service database 140. User defined services associated with other network nodes may be similarly defined and registered.

In one implementation, application component 112a_1 may initiate a service management request. Service management library layer 120 associated with network node 702a may receive the service management request via a corresponding service API. Query service module 120c may be called to query the global service database 140 for service configuration information about a service associated with the service management request. Based on, for example, the service location information, a determination may be made regarding whether the service is located locally (i.e. at network node 702a), or remotely (any other network node), by locate service module 120d, for example. If the service is located locally, the service management request may be serviced locally (for example, via the local service management infrastructure for network node 702a which may be Windows SCM). If the service is located at a remote node (for example, network node 702b), service management library layer 120 associated with network node 702a may transfer the request to the service management library layer 120 associated with network node 702b, and the request may be serviced by the remote service management infrastructure for network node 702b which may be Solaris SMF.

To support a distributed system, service management library layers associated with the network nodes may process remote node service management requests and may transfer the requests to the appropriate remote node as needed. There may be service configure/start/query stub codes in the distributed system.

It will be understood that while FIG. 7 depicts application 112a as a distributed application, the invention is not so limited. The network nodes may each implement different applications (not distributed applications) that would send/initiate service management requests to each other via service management library layers of the network nodes. Also, application 112n in application layer 110 of network node 702n may be a component of distributed application 112a or a different distributed or non-distributed application. The general service management framework implemented by network node 702n may comprise application 112n in application layer 110 that may communicate with service management library layer 120, and Linux service management 130c in the service management provider layer 130.

Figure 8:
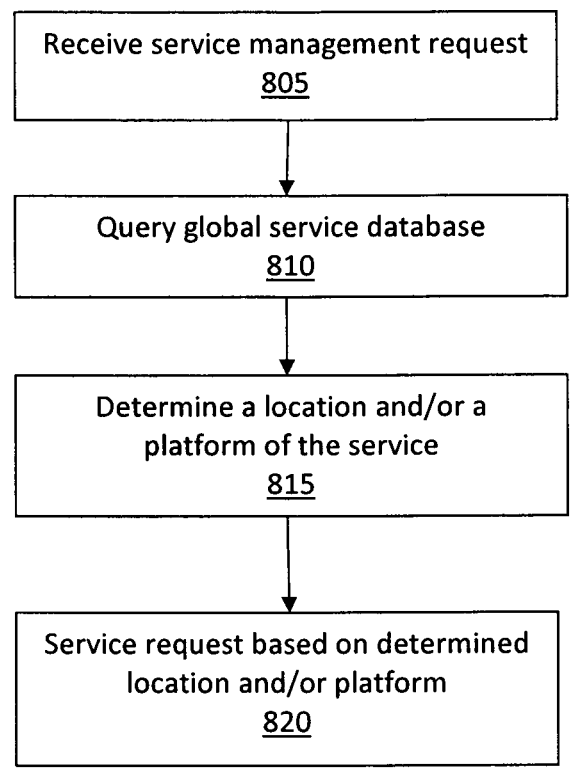
FIG. 8 is a flowchart depicting example operations for servicing requests via a general service management framework, according to various aspects of the invention.

FIG. 8 is a flowchart 800 depicting example operations for servicing requests via a general service management framework, according to various aspects of the invention. In some implementations, the example operations may be performed by one or more modules/sub-modules described herein. In some implementations, various operations may be performed in different sequences. In other implementations, additional operations may be performed along with some or all of the operations shown in FIG. 8. In yet other implementations, one or more operations may be performed simultaneously. In yet other implementations, one or more operations may not be performed. Accordingly, the operations described are exemplary in nature and, as such, should not be viewed as limiting.

In operation 805, a service management request may be received at a general service management framework. In operation 810, global service database 140 may be queried by the framework to retrieve service configuration information for a service associated with the service management request. In operation 815, a location and/or a platform of the service associated with the service management request may be determined based on the retrieved service configuration information. In operation 820, the service management request may be serviced based on the determined location and/or platform.

Figure 9:
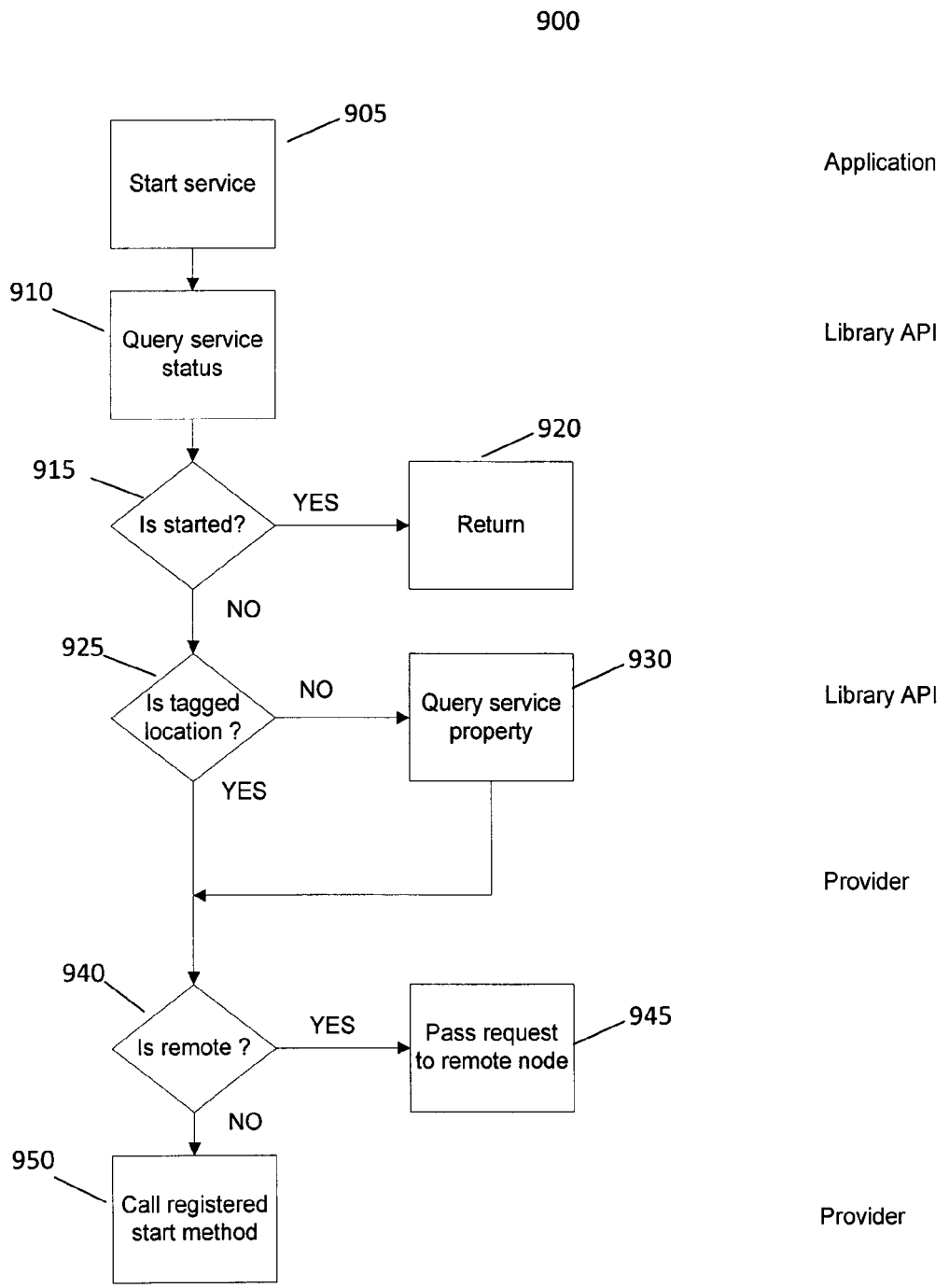
FIG. 9 is a flowchart depicting example operations performed by a general service management framework, according to various aspects of the invention.

FIG. 9 is a flowchart 900 depicting example operations performed by the framework to manage a service management request, according to various aspects of the invention. In some implementations, the example operations may be performed by one or more modules/sub-modules described herein. In some implementations, various operations may be performed in different sequences. In other implementations, additional operations may be performed along with some or all of the operations shown in FIG. 9. In yet other implementations, one or more operations may be performed simultaneously. In yet other implementations, one or more operations may not be performed. Accordingly, the operations described are exemplary in nature and, as such, should not be viewed as limiting.

In operation 905, at least one network node may initiate a service management request, for example, a service start request. In one implementation, the service associated with the service management request may be a service located locally at the network node that initiated the service management request or may be located remote from the network node that initiated the request (in other words, the service may be located at another node remote from the network node that initiated the request). In one implementation, the general service management framework associated with the at least one network node may receive the initiated service management request. In one implementation, an application/component of application running on the at least one network node (i.e., associated with application layer 110 of the at least one network node) may initiate the service management request. Service management library layer 120 associated with the at least one network node may receive the service management request through corresponding service library APIs.

In operation 910, the query status sub-module 605 may be called to get the status of the service associated with the service management request. In operation 915, a determination may be made as to whether the service is in "started" state based on the obtained status information. In some implementations, this determination may be made by locate service module 120d. In response to a determination that the service is in "started" state, no further processing may be performed, in operation 920. In response to a determination that the service is not in "started" state, the processing proceeds to operation 925.

In one implementation, each service management request may include a tag that denotes whether the request has been located. The first time a specific service management request is initiated, the tag may indicate "not located". Thereafter, any subsequent times the service management request is initiated, the tag may indicate "located" and may be transferred to its destination directly.

In operation 925, a determination may be made as to whether the initiated service management request is tagged located or not located, by locate service module 120d, for example. The determination may be made by checking the tag associated with the service management request. In response to a determination that the service management request is tagged "not located", the query properties sub-module 610 may be called, in operation 930, to query the global service database 140 for details regarding the service associated with the service management request, for example, service configuration information (i.e., name, location, dependency, type, etc.).

Based on the retrieved service configuration information, the location of the service associated with the service management request may be determined and the service management request may be tagged as located, by locate service module 120d, for example.

In operation 940, a determination may be made as to whether the service associated with the service management request is located locally or remotely, by locate service module 120d, for example. This determination may be made based on the service location information retrieved from the global service database 140. In response to a determination that the service is located remotely, the service management request may be transferred to a remote general service management framework. In one implementation, the service management library layer 120 associated with the at least one network node that initiated the request may transfer the service management request to the remote node, in operation 945. In one implementation, locate service module 120d may transfer the service management request to the remote node. In response to a determination that the service is located locally, service management request may be serviced locally (for example, via the local service management infrastructure of the network node that initiated the request).

In one implementation, for a start service request, the registered start method may be called in operation 950. The registered start method associated with the start service request may be determined from the service configuration information retrieved from the global service database 140. The local service management infrastructure may accordingly call the registered start method to start the service. In one implementation, the service start may be supported by service start module 120b. In one implementation, service start module 120b may call the registered start method to start the service.

In one implementation, while the operations described in FIG. 9 are performed based on a system/application initiated service management request, the service management request may be user-initiated without departing from the spirit of the invention.

The operations performed by the general service management framework are transparent to the applications running on the network nodes. The applications need not know the location of a service. The general service management framework makes service management convenient, for example, services may be easily and dynamically added, removed, defined, etc. A user or developer need not learn complicated interfaces or protocols to manage services. The general service management framework may provide simple services management interfaces (which are platform independent and easy to learn) to users.

In one implementation, all services defined for the network nodes may be auto-discovered, provided that the services have been registered into the framework. The registration may be done by calling a specific service provider registration method. Each service provider may provide a service registration method. The service registration method may be called by passing the service's detailed parameters, by a user, for example. The service registration method may then add the service configuration information to the global service database.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for servicing requests via a general service management framework, the method executed by a processor configured to perform a plurality of operations, the operations comprising:
   receiving a service management request associated with a first node, the service management request comprising a tag that denotes whether a service associated with the service management request has been located;
   determining a status of the service associated with the service management request as in a not started state;
   determining that the service associated with the service management request is tagged as not located;
   querying, in response to determining the status is the not started state and the service associated with service management request is tagged as not located, a global service database to retrieve service configuration information for the service associated with the service management request, wherein the global service database stores service configuration information associated with a plurality of services defined and added to the framework, the plurality of services comprising services residing on the first node and a second node remote from the first node, and wherein the global service database is remote from and communicably coupled to the first node and the second node;
   determining a location of the service associated with the service management request based on the retrieved service configuration information, wherein said determining comprises determining whether the service is located local to the first node or located at the second node remote from the first node;
   determining a platform on which the service associated with the service management request executes based on the retrieved service configuration information, wherein said determining comprises determining whether the service executes on a first platform of the first node or on a second platform of the second node, wherein the first platform is different that the second platform; and
   servicing the service management request based on the determined location and platform.

2. The computer-implemented method of claim 1, wherein the service management request is a start service request.

3. The computer-implemented method of claim 1, wherein the service configuration information for the service associated with the service management request comprises one or more of service name, service location, service methods, service type or service dependency.

4. The computer-implemented method of claim 1, wherein the operations further comprising:
   in response to a determination that the service is located local to the first node, servicing the service management request via a local service management infrastructure associated with the first platform of the first node.

5. The computer-implemented method of claim 1, the operations further comprising:
   in response to a determination that the service is located at the second node remote form the first node:
   transferring the service management request to the second node, wherein the service management request is serviced via a local service management infrastructure associated with the second platform of the second node.

6. The computer-implemented method of claim 1, the operations further comprising:
   tagging the service management request as located in response to the determination of the location of the service.

7. The computer-implemented method of claim 1, the operations further comprising:
   determining whether the service is located local to the first node, located at the second node remote from the first node, or located at a third node remote from the first node and the second node, wherein the third node does not include a local service management infrastructure associated with a third platform of the third node, and wherein the third platform is different than the first platform and the second platform; and in response to a determination that the service is located at the third node remote from the first node and the Second node, servicing the service management request by transferring the service management request to the third node, wherein the service management request is serviced based on a service method associated with the service, wherein the service configuration information associated with the service comprises the service method associated with the service.

8. A non-transitory computer-readable storage medium having computer-readable instructions thereon which when executed by a processor cause the processor to perform operations comprising:

receiving a service management request associated with a first node, the service management request comprising a tag that denotes whether a service associated with the service management request has been located;

determining a status of the service associated with the service management request as in a not started state;

determining that the service associated with the service management request is tagged as not located;

querying, in response to determining the status is the not started state and the service associated with service management request is tagged as not located, a global service database to retrieve service configuration information for the service associated with the service management request, wherein the global service database stores service configuration information associated with a plurality of services defined and added to a general service management framework, the plurality of services comprising services with residing on the first node and a second node remote from the first node, and wherein the global service database is remote from and communicably coupled to the first node and the second node;

determining a location of the service associated with the service management request based on the retrieved service configuration information, wherein the instructions further cause the the processor to determine whether the service is located local to the first node or located at the second node remote from the first node;

determining a platform on which the service associated with the service management request executes based on the retrieved service configuration information, wherein determining a platform further comprises determining whether the service executes on a first platform of the first node or on a second platform of the second node, wherein the first platform is different that the second platform; and servicing the service management request based on the determined location and platform.

9. The non-transitory computer-readable storage medium of claim 8, wherein the service management request is a start service request.

10. The non-transitory computer-readable storage medium of claim 8, wherein the service configuration information for the service associated with the service management request comprises one or more of service name, service location, service methods, service type or service dependency.

11. The non-transitory computer-readable storage medium of claim 8, wherein the operations further comprise:

in response to a determination that the service is located local to the first node, servicing the service management request via a local service management infrastructure associated with the first platform of the first node.

12. The non-transitory computer-readable storage medium of claim 8, wherein the operations further comprise:

in response to a determination that the service is located at the second node remote from the first node:

transferring the service management request to the second node, wherein the service management request is serviced via a local service management infrastructure associated with the second platform of the second node.

13. The non-transitory computer-readable storage medium of claim 8, the operations further comprise:

tagging the service management request as located in response to the determination of the location of the service.

14. A computer-implemented system for servicing requests via a general service management framework, the system comprising:

a processor; and a memory coupled to the processor and comprising computer readable program code embodied in the memory that when executed by the processor causes the processor to perform operations comprising:

receiving a service management request associated with a first node, the service management request comprising a tag that denotes whether a service associated with the service management request has been located;

determining a status of the service associated with the service management request as in a not started state;

determining that the service associated with the service management request is tagged as not located;

querying, in response to determining the status is the not started state and the service associated with service management request is tagged as not located, a global service database to retrieve service configuration information for the service associated with the service management request, wherein the global service database stores service configuration information associated with a plurality of services defined and added to the framework, the plurality of services comprising services residing on the first node and a second node remote from the first node, and wherein the global service database is remote from and communicably coupled to the first node and the second node;

determining a location of the service associated with the service management request based on the retrieved service configuration information, wherein the processors are further configured to determine whether the service is located local to the first node or located at a second node remote from the first node;

determining a platform on which the service associated with the service management request executes based on the retrieved service configuration information, wherein the determining a platform are further comprises determining whether the service executes on a first platform of the first node or on a second platform of the second node, wherein the first platform is different that the second platform; and servicing the service management request based on the determined location and platform.

15. The computer-implemented system of claim 14, wherein the service management request is a start service request.

16. The computer-implemented system of claim 14, wherein the service configuration information for the service associated with the service management request comprises one or more of service name, service location, service methods, service type or service dependency.

17. The computer-implemented system of claim 14, wherein the operations further comprise:
    in response to a determination that the service is located local to the first node, servicing the service management request via a local service management infrastructure associated with the first platform of the first node.

18. The computer-implemented system of claim 14, wherein the operations further comprise:
    in response to a determination that the service is located at a second node remote from the first node:
    transferring the service management request to the second node, wherein the service management request is serviced via a local service management infrastructure associated with the second platform of the second node.

19. The computer-implemented system of claim 14, the operations further comprise:
    tagging the service management request as located in response to the determination of the location of the service.

20. A computer-implemented method for cross-platform management of services executing on a plurality of platforms, the method executed by a processor configured to perform a plurality of operations, the operations comprising:
    receiving, from a first node, a first registration of a first service executing on a first platform, the first registration including first service configuration information used to access the first service;
    receiving, from a second node, a second registration of a second service executing on a second platform different from the first platform, the second registration including second service configuration information used to access the second service;
    storing the first and second service configuration information in a global service database remote from and communicably coupled to the first node and the second node, wherein the global service database stores service configuration for services residing on the first node and the second node, the global service database being remote from and communicably coupled to the first node and the second node, and wherein the global service database is queried to provide the first service configuration information to access the first service in response to a determination that the first service executes on the first platform of the first node, and wherein the global service database is queried to provide the second service configuration information to access the second service in response to a determination that the second service executes on the second platform of the second node, thereby providing information used to gain cross-platform access to the first and second services; and wherein the global service database is queried after determining a status of a service associated with a service management request is in a not started state, the service management request comprising a tag that denotes whether the service associated with the service management request has been located and determining that the service associated with the service management request is tagged as not located.

\* \* \* \* \*

UNITED STATES PATENT AND TRADEMARK OFFICE
CERTIFICATE OF CORRECTION

PATENT NO. : 8,904,396 B2
APPLICATION NO. : 12/844195
DATED : December 2, 2014
INVENTOR(S) : B. Chang et al.

Page 1 of 1

It is certified that error appears in the above-identified patent and that said Letters Patent is hereby corrected as shown below:

In the Claims

At column 11, line 41 (claim 8, line 29) of the printed patent, please delete "the" after cause.

Signed and Sealed this
Ninth Day of June, 2015

Michelle K. Lee
*Director of the United States Patent and Trademark Office*